United States Patent
Mao et al.

(10) Patent No.: US 10,587,774 B2
(45) Date of Patent: Mar. 10, 2020

(54) 3D PRINTED OBJECT HALFTONE IMAGE GENERATION CONTAINING UPDATED VOXEL DATA

(71) Applicants: Hewlett-Packard Development Company, L.P., Spring, TX (US); Purdue Research Foundation, West Layfayette, IN (US)

(72) Inventors: Ruiyi Mao, West Lafayette, IN (US); Jan Allebach, West Lafayette, IN (US); Wanling Jiang, West Lafayette, IN (US); Lluis Abello Rosello, Sant Cugat del Valles (ES); Robert Ulichney, Stow, MA (US); Utpal Kumar Sarkar, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/342,503

(22) PCT Filed: Jan. 27, 2017

(86) PCT No.: PCT/US2017/015385
§ 371 (c)(1),
(2) Date: Apr. 16, 2019

(87) PCT Pub. No.: WO2018/140037
PCT Pub. Date: Aug. 2, 2018

(65) Prior Publication Data
US 2019/0351618 A1    Nov. 21, 2019

(51) Int. Cl.
*H04N 1/405* (2006.01)
*B29C 64/386* (2017.01)
(Continued)

(52) U.S. Cl.
CPC .......... *H04N 1/405* (2013.01); *B29C 64/112* (2017.08); *B29C 64/386* (2017.08); *B33Y 50/00* (2014.12);
(Continued)

(58) Field of Classification Search
CPC ............. H04N 1/40–4097; H04N 1/52; G06K 15/1881; B29C 64/112; B29C 64/386;
(Continued)

(56) References Cited

U.S. PATENT DOCUMENTS 9,286,554 B1    3/2016   Maltz et al.
10,401,834 B2*  9/2019   Morovic ............ G05B 19/4099
(Continued)

FOREIGN PATENT DOCUMENTS

CN      103763566 A       4/2014
WO      WO-2015072155 A1  5/2015
(Continued)

OTHER PUBLICATIONS

Allebach, "DBS: retrospective and future directions", Proceedings of SPIE, vol. 4300, 2001, 19 pages. Downloaded From: http://spiedigitallibrary.org/ on Mar. 8, 2017.
(Continued)

*Primary Examiner* — Scott A Rogers
(74) *Attorney, Agent, or Firm* — HP Inc. Patent Department (57) ABSTRACT

According to an example, an apparatus may include a processor and a memory. The memory may have stored thereon machine readable instructions that may cause the processor to access an initial halftone image of a three-dimensional (3D) object, the initial halftone image being generated from a continuous tone image of the 3D object. The instructions may also cause the processor to iteratively modify voxel data for the initial halftone image to identify
(Continued)

updated voxel data that more accurately corresponds to the continuous tone image than the initial halftone image and to generate halftone image printing data for the 3D object containing the updated voxel data.

15 Claims, 4 Drawing Sheets

(51) Int. Cl.
    *G06K 15/02*     (2006.01)
    *B33Y 50/00*     (2015.01)
    *B29C 64/112*     (2017.01)
    *H04N 1/52*     (2006.01)

(52) U.S. Cl.
    CPC ..... *G06K 15/1878* (2013.01); *G06K 15/1881* (2013.01); *H04N 1/52* (2013.01)

(58) Field of Classification Search
    CPC ....... B29C 64/393; B33Y 50/00; B33Y 50/02; B41J 2/205–2056
    See application file for complete search history.

(56) References Cited

U.S. PATENT DOCUMENTS

2015/0258770 A1    9/2015   Chan et al.
2018/0134028 A1*  5/2018   Morovic ................ B33Y 50/02

FOREIGN PATENT DOCUMENTS

WO    WO-2015111059 A1    7/2015
WO    WO-2016068915 A1    5/2016
WO    WO-2016122564 A1    8/2016

OTHER PUBLICATIONS

Analoui, et al., "Model Based Halftoning using Direct Binary Search", SPIE vol. 1666 Human Vision, Visual Processing, and Digital Display III,1992, pp. 96-108. Downloaded From: http://spiedigitallibrary.org/ on Mar. 8, 2017.

Baqai, et al., "Halftoning via Direct Binary Search Using Analytical and Stochastic Printer Models", IEEE Transactions on Image Processing, vol., 12, No. 1, Jan. 2003, 15 pages.

Brunton, et al., "Pushing the Limits of 3D Color Printing: Error Diffusion with Translucent Materials", ACM Transactions on Graphics, vol. 35, No. 1, Article 4, Dec. 2015, 15 pages.

Cho, et al., "A dithering algorithm for local composition control with three-dimensional printing", Computer-Aided Design, vol. 35, 2003, pp. 851-867.

International Search Report and Written Opinion dated Sep. 14, 2017, PCT Patent Application No. PCT/US2017/015385, filed Jan. 27, 2017, Federal Institute of Industrial Property ISA/RU, 7 pages.

Kim, et al., "Impact of HVS Models on Model-Based Halftoning", IEEE, 2002, pp. 258-269.

Lee, et al., "Colorant-based direct binary search halftoning", Journal of Electronic Imaging, vol. 11, Issue 4, Oct. 2002, pp. 517-527. Downloaded From: http://spiedigitallibrary.org/ on Mar. 8, 2017.

Lieberman, et al., "A Dual Interpretation for Direct Binary Search and Its Implications for Tone Reproduction and Texture Quality", IEEE Transactions on Image Processing, vol. 9, No. 11, Nov. 2000, pp. 1950-1963.

Lieberman, et al., "Efficient Model Based Halftoning Using Direct Binary Search", IEEE, 1997, pp. 775-778.

Nasanen, "Visibility of Halftone Dot Textures", IEEE Transactions on Systems, Man, and Cybernetics, vol. SMC-14, No. 6, Nov./Dec. 1984, pp. 920-924.

Rao, et al., "Analysis of Ordered Dither for Arbitrary Sampling Lattices and Screen Periodicities", IEEE Transactions on Acoustics, Speech and Signal Processing, vol. 38, No. 11, Nov. 1990, pp. 1981-2000.

Zhou, et al., "Three-Dimensional Digital Halftoning for Layered Manufacturing Based on Droplets", vol. 37, 2009, pp. 175-182. < http://www-bcf.usc.edu/~yongchen/Research/NAMRC%2037-Halftoning_Final.pdf >.

* cited by examiner

3D PRINTED OBJECT HALFTONE IMAGE GENERATION CONTAINING UPDATED VOXEL DATA

CLAIM FOR PRIORITY

The present application is a national stage filing under 35 U.S.C. § 371 of PCT application number PCT/US2017/015385, having an international filing date of Jan. 27, 2017, the disclosure of which is hereby incorporated by reference in its entirety.

BACKGROUND 3D manufacturing apparatuses that employ additive manufacturing techniques to build or print parts are gaining in popularity and use. Some additive manufacturing techniques employ a layering process in which particles of build material are spread into a layer and selectively fused together. Following that process, additional particles are spread into another layer and fused together. This process may be repeated for a number of times to build up a 3D part having a customized configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

In digital imaging, a flat image is spatially represented as a 2-dimensional array of discrete units called pixels, to each of which a value or a tuple of values, representing the tone, is assigned. When the range of possible values is such that the human visual system (HVS) perceives the range as continuous, the image is considered to be a continuous tone (or contone) image, e.g., a computer display, a camera, etc. A printing system can produce just a limited number of tones, so that a general contone image cannot be reproduced as-is. The process of converting a contone image to an image with a limited number of tones is called halftoning and a resulting image is called a halftone image.

Disclosed herein are apparatuses and methods for generating halftone image printing data for a 3D object. Generally speaking, the apparatuses and methods disclosed herein may generate the halftone image printing data by iteratively modifying voxel data for the voxels on the surfaces or boundaries of the 3D object through application of trial changes and identifying the modified voxel data that results in a minimized or nearly minimized perceptual difference between the generated 3D halftone image and the 3D continuous tone image of the 3D object. In other words, the apparatuses and methods disclosed herein may generate the halftone image printing to include voxel data that accurately corresponds to the continuous tone image of the exterior surface of a 3D object to be printed. In one regard, therefore, the halftone printing data generated through implementation of the apparatuses and methods disclosed herein may improve the image reproduction quality of 3D surfaces of 3D objects.

According to examples, a direct binary search technique may be applied to generate the halftone image printing data. Under this technique, the mean-squared error between a perceptually filtered continuous tone original 3D image and the halftone image may seek to be minimized. In addition, the voxels of the 3D object may be scanned to identify the voxels that are on the surface of the 3D object and trial changes may be performed on those voxels. Error values of halftone images resulting from the trial changes (and/or differences in error values from a set error value) may be calculated and the states of the voxels corresponding to the trial change resulting in the smallest error value (or difference in error value) may be identified. After multiple iterations, the states of the voxels that resulted in the minimized or nearly minimized error values between the generated halftone images and the continuous tone image may be identified and the voxel data may be updated with the states. Additionally, a final halftone image printing data may be generated using the updated voxel data. By performing the trial change iterations only on the voxels located on the surfaces or boundaries of the 3D object, the amount of computation and the computation time may be reduced. Additional manners to reduce the computational requirements of the methods disclosed herein are also discussed herein with respect to the generation of blocks of voxels.

According to examples, the generated halftone image printing data may be implemented by 3D printers that are able to perform voxel-wise printing, e.g., able to control characteristics of a 3D printed object at the voxel level. An example of a suitable 3D printer technology that may perform voxel-wise printing is powder-based fusing technology.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
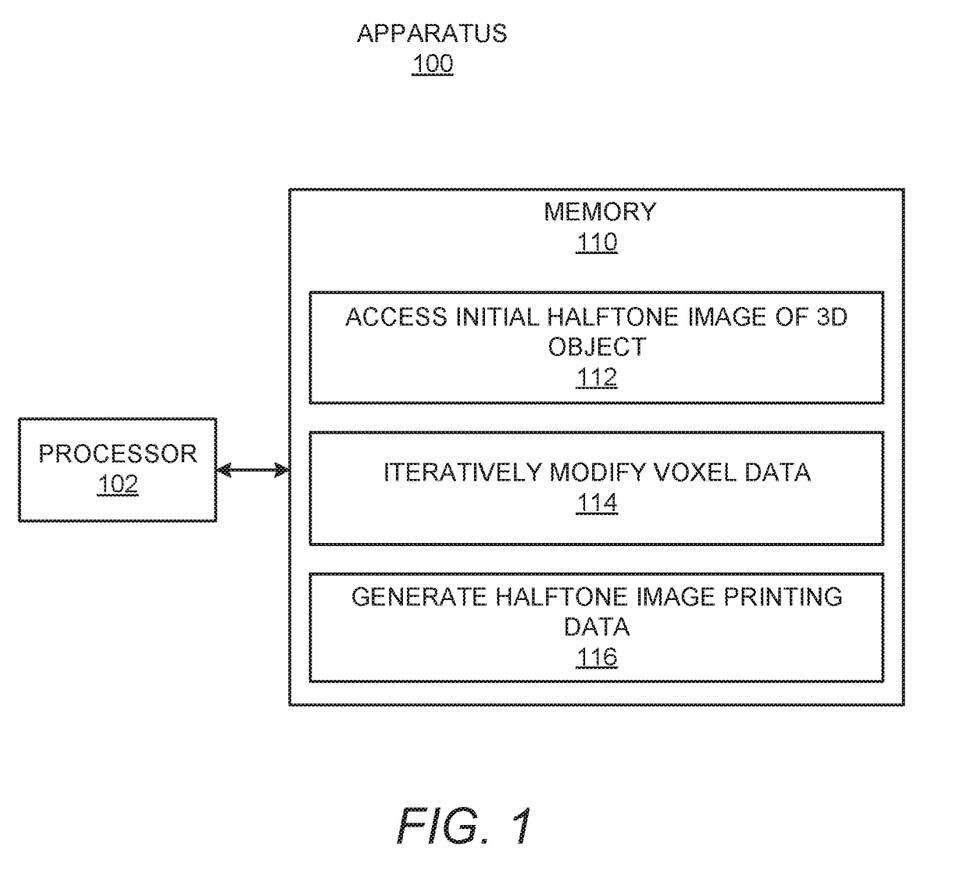
FIGS. 1 and 2, respectively, show simplified block diagrams of example apparatuses that may be implemented to generate halftone image printing data for a 3D object.

With reference first to FIG. 1, there is shown a simplified block diagram of an example apparatus 100 that may be implemented to generate halftone image printing data for a 3D object. It should be understood that the apparatus 100 depicted in FIG. 1 may include additional components and that some of the components described herein may be removed and/or modified without departing from a scope of the apparatus 100 disclosed herein.

The apparatus 100 may be a personal computer, a laptop computer, a tablet computer, a server computer, or the like. In other examples, the apparatus 100 may be or may be part of a three-dimensional (3D) printer. In any regard, the apparatus 100 may include a processor 102 and a memory 110 on which is stored machine readable instructions 112-116 that the processor 102 may fetch, decode, and execute. The processor 102 may be a semiconductor-based microprocessor, a central processing unit (CPU), an application specific integrated circuit (ASIC), a field-programmable gate array (FPGA), and/or other hardware device. The memory 110 may be an electronic, magnetic, optical, or other physical storage device that contains or stores executable instructions. The memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to access an initial halftone image of a 3D object, in which the initial halftone image is generated from a continuous tone image of the 3D object. According to examples, the processor 102 may generate the initial halftone image from the continuous tone image. In these examples, the processor 102 may employ any suitable operation to generate the initial halftone image of the 3D object from the continuous tone image. In a particular example, the processor 102 may randomly generate the initial halftone image of the 3D object from the continuous tone image. In other examples, the initial halftone image may be generated by a device other than the processor 102 and the processor 102 may receive the generated initial halftone image from the other device.

In any regard, the continuous tone image of the 3D object may identify a continuous range of characteristic data for each voxel of the 3D object. In some examples, the continuous tone image of the 3D object may identify a continuous range of color values for each voxel on the surfaces (or equivalently, the boundaries) of the 3D object. In addition or in other examples, the continuous tone image of the 3D object may identify other values such as, transparency levels, materials (e.g., the amounts of particular liquids applied, the types of liquid supplied, etc.), textures, or the like for each of the voxels on the surfaces (or boundaries) of the 3D object. A voxel may be defined as a point in a three-dimensional grid. In addition, the generated halftone image may simulate the continuous tone image of the 3D object through use of dots on the voxels located at the surfaces of the 3D object that vary in size, in spacing, in color, in texture, in transparency level, etc.

The processor 102 may fetch, decode, and execute the instructions 114 to iteratively modify voxel data for the initial halftone image to identify updated voxel data that more accurately corresponds to the continuous tone image than the initial halftone image. Particularly, the initial halftone image may indicate initial voxel data for the voxels on the surfaces of the 3D object. The initial voxel data may include respective characteristic data for the voxels such as color, transparency level, material, texture, or the like. Therefore, according to examples, the voxel data for a voxel may indicate whether the voxel is to be colored or not, e.g., receive printing liquid or not, is to receive a particular amount of an agent, or the like. As discussed in greater detail herein below, a directed binary search may be performed to iteratively modify the voxel data for the voxels on the surfaces of the 3D object to identify modified voxel data for the voxels that may result in a minimized or a nearly minimized error value between the continuous tone image and the halftone image of the 3D object. The error value may be determined through implementation of a human visual system model or filter as discussed below.

The processor 102 may fetch, decode, and execute the instructions 116 to generate halftone image printing data for the 3D object containing the updated voxel data. The updated voxel data may include respective characteristic data for the voxels such as color, transparency level, material, texture, or the like. Particularly, the processor 102 may generate the halftone image printing data for the 3D object such that the voxels on the exterior surfaces of the 3D object may be printed according to the updated voxel data and thus exhibit the respective characteristic data.

Figure 2:
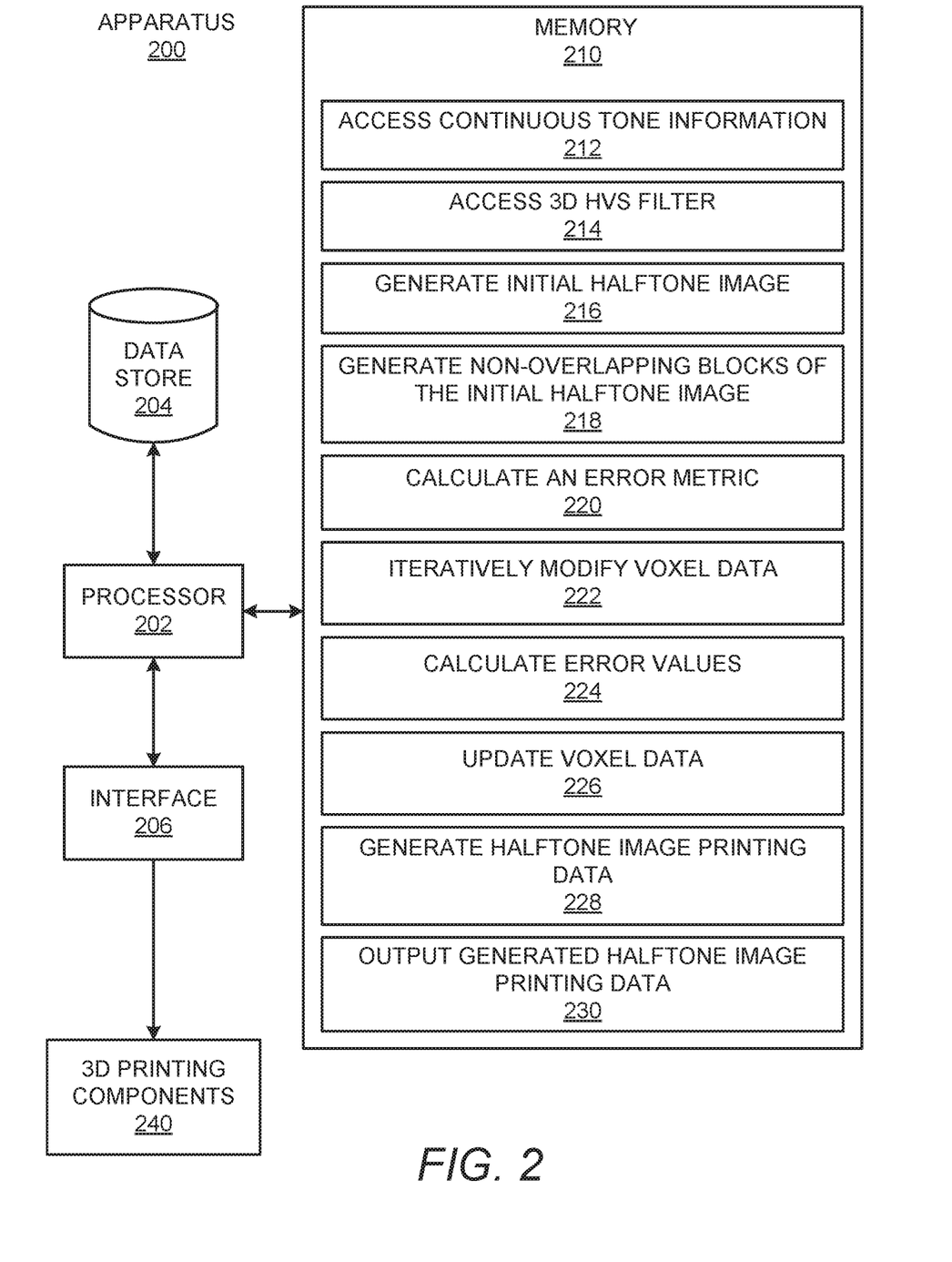

Turning now to FIG. 2, there is shown a simplified block diagram of another example apparatus 200 that may be implemented to generate halftone image printing data for a 3D object. It should be understood that the apparatus 200 depicted in FIG. 2 may include additional components and that some of the components described herein may be removed and/or modified without departing from a scope of the apparatus 200 disclosed herein.

The apparatus 200 may be similar to the apparatus 100 depicted in FIG. 1 and may thus be a computing device or a 3D printer. The apparatus 200 may include a processor 202 and a memory 210 on which is stored machine readable instructions 212-230 that the processor 202 may fetch, decode, and execute. The processor 202 may be similar to the processor 102 and the memory 210 may be similar to the memory 110 depicted in FIG. 1 and thus, examples of the processor 210 and the memory 210 are not repeated. The apparatus 200 may also include a data store 204 and an interface 206. The data store 204 may be a Random Access Memory (RAM), an Electrically Erasable Programmable Read-Only Memory (EEPROM), a storage device, an optical disc, and the like. The data store 204 may have stored thereon data pertaining to a 3D object to be printed such as, the continuous tone image of the 3D object, the locations in each layer of build material particles, portions of the 3D object to be formed, the number of layers to be employed, etc.

The processor 202 may fetch, decode, and execute the instructions 212 to access a continuous tone image of a 3D object. The processor 202 may access the continuous tone image (or equivalently, data corresponding to the continuous tone image) from the data store 204 or from another source, such as a source that is externally located from the apparatus 200. For instance, the processor 202 may access the continuous tone image of the 3D object through a network (not shown) via the interface 206, which may include hardware and/or software to enable the processor 202 to communicate and receive data over the network. In any regard, and as discussed herein, the continuous tone image for the 3D object may identify a continuous range of characteristic data for each voxel of the 3D object, such as colors, transparency levels, textures, materials, or the like. In some examples, the continuous tone image may identify a continuous range of characteristic data for each voxel that is on an exterior surface of the 3D object.

The processor 202 may fetch, decode, and execute the instructions 214 to access a 3D human visual system (HVS) filter that may be implemented in identifying a halftone image that closely or most closely perceptually matches the continuous tone image. By way of particular non-limiting example, the perceived 3D halftone image $\tilde{g}(x)$ through the human visual system may be calculated by convolving the original halftone image g[m] with a 3D HVS filter $\tilde{p}(x)$ as:

$$\tilde{g}(x) = \sum_m g[m]\tilde{p}(x - Xm). \qquad \text{Equation (1)}$$

In Equation (1), X is a periodicity matrix whose columns include a basis for the lattice. In examples in which a pixel is square or rectangular or a voxel is cubic or cuboid, X may be a diagonal matrix with each diagonal element having the value of the size of a pixel or voxel along one dimension. In other words, X may be defined as a matrix that contains information pertaining to pixel or voxel dimension values. In addition, the discrete perceived 3D halftone image may be defined as:

$$\tilde{g}[m] = g[m] * \tilde{p}[m] = \sum_n g[n]\tilde{p}[m-n]. \qquad \text{Equation (2)}$$

In addition, the perceived 3D original continuous tone image may be defined as:

$$\tilde{f}[m] = f[m] * \tilde{p}[m] = \sum_n f[n]\tilde{p}[m-n]. \qquad \text{Equation (3)}$$

In Equations (1)-(3), f[m] may denote the original discrete 3D continuous tone image and g[m] may denote the original discrete 3D halftone image. For monochrome halftone, g[m]=0 or 1. In addition, $(x)=(x,y,z)^T \in R^3$ may represent the continuous 3D spatial coordinates and $[m]=[m, n, o]^T \in Z^3$ may represent discrete 3D spatial coordinates.

A HVS filter may be defined as a HVS model that captures the low-pass characteristic of the HVS. The HVS filter may be used in a halftoning process to obtain the perception of images. According to the HVS model, a spatial 2D HVS filter is an isotropic symmetric function on a 2D plane with its maximal value at the origin. All points on the filter plane with the same distance from origin have the same value and these points form one of the concentric circles centered at the origin. Since the 2D HVS filter is symmetric and isotropic, the 3D HVS filter may be built by revolving the 2D circular filter plane around any of the diameters of the 2D circular filter and duplicating its value on any spatial coordinate that the 2D circular filter goes through. By doing this, a 3D spherical HVS filter may be built and any cross section going through the 3D spherical HVS filter center may be a duplicate of the original 2D HVS filter. Similar to a 2D filter, a spatial 3D HVS filter is an isotropic symmetric function in a 3D space with its maximal value at the origin and all the points on any sphere centered at the origin have the same value, which generally decreases with its distance from the origin.

According to the sensitivity function of the human visual system, the effective supporting area of a normal HVS filter may be a hundredth to even a few thousandths of one square inch according to a normal viewing distance. As a result, when a HVS filter is applied to the surface of a 3D object, the part of the surface covered by the filter supporting area may be approximated as a flat plane. With the property of the 3D HVS filter discussed above, the correct HVS response may be obtained as long as the origin of the 3D HVS filter is applied on the 3D surface, since any cross section of the 3D filter is exactly a duplicate of a 2D HVS filter with its normal perpendicular to the cross section, which is the 3D surface plane. By doing this, an accurate and efficient HVS response may be obtained without modification of the HVS filter according to the 3D surface orientation. When a circular 2D HVS filter and a spherical 3D HVS filter are applied on 3D surfaces with different orientations, the 2D HVS filter may need to be adjusted for different surfaces in order to make sure its normal is parallel to the surface normal. In addition, regardless of the surface orientation, as long as the 3D filter center is on the surface, it may be equivalent to applying a correctly adjusted 2D filter whose normal is perpendicular to the surface plane because the cross section containing the 3D filter center is a duplicate of the original 2D HVS filter.

An HVS filter is based on the contrast sensitivity function of the human visual system. According to an example, the luminance contrast sensitivity based on Näsänen's model may be used for the HVS filter, although other models may be used. The luminance spatial frequency response $H(\bar{u},\bar{u})$ of the original 2D Näsänen's model is given by:

$$H(\bar{u}, \bar{v}) = a\Gamma^{-b} \exp\left(\frac{\sqrt{\bar{u}^2 + \bar{v}^2}}{c\ln\Gamma + d}\right). \qquad \text{Equation (4)}$$

In Equation (4), $(\bar{u}, \bar{v})$ is the spatial frequency coordinates in cycles/degree subtended at the retina.

By taking the inverse 2D continuous-space Fourier transform, the 2D spatial filter $H(\bar{x}, \bar{y})$ is obtained and the units of $(\bar{x},\bar{y})$ are degrees subtended at the retina. In order to convert the units on the retina to a printed page, it is discovered that a length x inches on the paper viewed at a distance D inches will subtend the angle $(\bar{x})$ degrees as:

$$\bar{x} = \frac{180}{\pi}\tan^{-1}\left(\frac{x}{D}\right) \approx \frac{180}{\pi D}x, \quad \text{for } x \ll D. \qquad \text{Equation (5)}$$

In addition, the continuous Näsänen's model HVS filter may be obtained as:

$$\tilde{p}(x, y) = h(x, y) = a\Gamma^{-b} \frac{2\pi k}{(k^2 + 4\pi^2(x^2 + y^2))^{3/2}}, \qquad \text{Equation (6)}$$

And the discrete Näsänen's model HVS filter is:

$$\tilde{p}[m, n] = h[m, n] = h\left(\frac{m}{R}, \frac{n}{R}\right) = a\Gamma^{-b} \frac{2\pi k}{\left(k^2 + \frac{4\pi^2}{R^2}(m^2 + n^2)\right)^{3/2}}. \qquad \text{Equation (7)}$$

In Equations (4)-(7), $a = 131.6$ $b = 0.3188$ $c = 0.525$ $d = 3.91$ $k = \frac{(\pi D)/180}{c\ln\Gamma + d}$ $\Gamma$ average luminance of the light reflected from the print in $cd/m^2$ $D$ viewing distance $R$ printer resolution It should be noted that S=RD is called Scale Factor and is used in describing the human visual system. By way of particular example, the printer resolution R and viewing distance D may be set to be 300 dpi and 10 inch, which yield a scale factor S of 3000. As discussed above, the 3D Näsänen's model HVS filter may be built by revolving the 2D circular filter plane around any of its diameters and duplicating its value on any spatial coordinate it goes through so that any cross section going through its center is a duplicate of a 2D Näsänen's model HVS filter. By doing this the continuous 3D Näsänen's model HVS filter may be defined as:

$$h(x, y, z) = aI^b \frac{2\pi k}{(k^2 + 4\pi^2(x^2 + y^2 + z^2))^{3/2}}. \quad \text{Equation (8)}$$

The discrete 3D Näsänen's model HVS filter may be obtained as:

$$h[m] = h[m, n, o] = \quad \text{Equation (9)}$$

$$h\left(\frac{m}{R}, \frac{n}{R}, \frac{o}{R}\right) = aI^b \frac{2\pi k}{\left(k^2 + \frac{4\pi^2}{R^2}(m^2 + n^2 + o^2)\right)^{3/2}}.$$

Since the filter function has no boundary, the spherical truncated discrete Näsänen's model HVS filter in the 3D spatial domain may be given by:

$$h[m] = h[m, n, o] = \quad \text{Equation (10)}$$

$$h_r[m, n, o] = \begin{cases} h[m, n, o], & \sqrt{m^2 + n^2 + o^2} \leq N \\ h[m, n, o], & (N + 1 - \sqrt{m^2 + n^2 + o^2}), \\ & N < \sqrt{m^2 + n^2} \leq N + 1 \\ 0, & N + 1 < \sqrt{m^2 + n^2 + o^2}. \end{cases}$$

Generally speaking, the mean squared error between the perceived halftone image and the continuous tone image may depend on p̃(x) through its autocorrelation function ($C_{pp}$):

$$c_{\tilde{p}\tilde{p}}(x) = \int \tilde{p}(y)\tilde{p}(y+x)dy \quad \text{Equation (11)}$$

Generally speaking, the autocorrelation function ($C_{pp}$) may be defined as an autocorrelation of the HVS filter function p(x).

By evaluating the function at points on the printer lattice, the following is obtained:

$$c_{\tilde{p}\tilde{p}}[m] = \sum_n \tilde{p}[n]\tilde{p}[n+m] = \tilde{p}[m] ** \tilde{p}[-m] = c_{\tilde{p}\tilde{p}}(Xm). \quad \text{Equation (12)}$$

The processor 202 may fetch, decode, and execute the instructions 216 to generate an initial halftone image from the continuous tone image of the 3D object. The processor 202 may employ any suitable operation to generate the initial halftone image of the 3D object. In a particular example, the processor 102 may randomly generate the initial halftone image of the 3D object.

Figure 3:
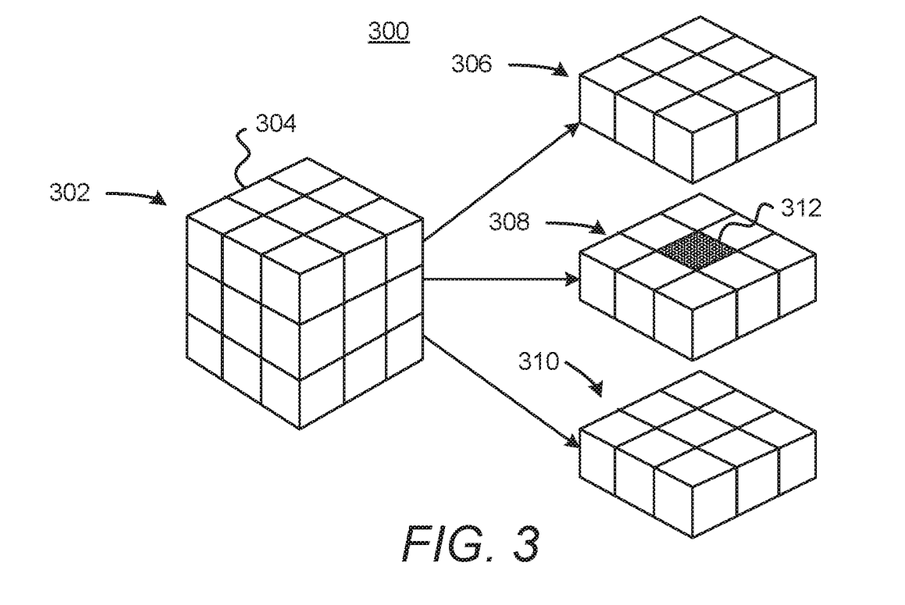
FIG. 3 shows a diagram of an example block containing a 3D array of voxels.

The processor 202 may fetch, decode, and execute the instructions 218 to generate non-overlapping blocks of the initial halftone image. Particularly, the processor 202 may generate the non-overlapping blocks to each be composed of a 3D array of voxels, in which at least one of the voxels in each of the generated blocks is on the surface of the 3D object. An example diagram 300 of a block 302 composed of a 3×3×3 array of voxels 304 is depicted in FIG. 3. The diagram 300 also shows the block 302 broken down into a top layer 306, a middle layer 308, and a bottom layer 310. A center voxel 312 is shaded to identify a particular voxel 312 in the block 302. According to examples, a plurality of blocks similar to the block 302 may be generated for the voxels located at the exterior surfaces of the 3D object. It should be noted that the block 302 has been depicted as including a 3×3×3 array of voxels 304 for purposes of illustration and that the block 302 may include other numbers of voxels 304 without departing from a scope of the examples disclosed herein. In addition, voxel data, e.g., characteristic data, pertaining to each of the voxels 304 in the blocks 302 may be identified and stored with the identified blocks 302.

The processor 202 may fetch, decode, and execute the instructions 220 to calculate an error metric from the continuous tone image and the initial halftone image. Generally speaking, the processor 202 may calculate the error metric based upon the perceived 3D halftone image and the perceived 3D continuous tone image through a human visual system through use of a 3D HVS filter. Particularly, for instance, the error metric may be calculated by determining the difference between the initial halftone image and the continuous tone image of the 3D object. A particular example is provided in which f[m] is used to denote the original continuous 3D object or an image of the 3D object where $[m]=[m, n, o]^T \in Z^3$. In this example, each voxel of f[m] on the 3D object surface takes an absorptance value between 0 to 1 for monochrome case and the voxels of a halftone image g[m] on the 3D object surface may take values of 0 (white) or 1 (black). The goal of direct binary search (DBS) is to compute a halftone image g[m] that has a minimal measure of a perceptually filtered error image from the continuous tone image. The error metric between the original continuous tone image and the halftone image may be given by:

$$e[m] = g[m] - f[m]. \quad \text{Equation (13)}$$

In addition, the continuous perceived error ẽ(x) may be defined as:

$$\tilde{e}(x) = \sum_m e[m]\tilde{p}(x - Xm), \quad \text{Equation (14)}$$

where $(x) = (x,y,z)^T \in R^3$.

Then the error metric may be minimized by a DBS algorithm, which may be the total squared perceived error (E) as denoted by:

$$E = \int |\tilde{e}(x)|^2 dx \quad \text{Equation (15)}$$

The processor 202 may fetch, decode, and execute the instructions 222 to iteratively modify voxel data and identify updated voxel data. During each iteration, the processor 202 may execute the instructions 222 to modify voxel data for the voxels 304 contained in the blocks 302. The processor 202 may modify the voxel data through performance of a trial change or through performance of multiple trial changes on the voxel data, such as toggle trials, swap trials, etc. By way of particular example, the processor 202 may modify the voxel data by implementing a toggle trial in which the state of the voxel is toggled between multiple states, e.g., between two states for a binary case. In addition, or in other examples, the processor 202 may modify the voxel data by implementing a swap trial in which the state of the voxel is swapped with neighbors in an M by M by M neighborhood that have a different state. The trial changes additionally or in other examples may include changes to at least one of color, texture, material, transparency, and the like to the voxel data.

During each iteration, the processor 202 may also fetch, decode, and execute the instructions 224 to calculate error values corresponding to the iteratively modified voxel data.

Particularly, for a given voxel during a given iteration, the processor 202 may implement a first trial change and may calculate an error value corresponding to that trial change. The error value may be calculated by determining the difference between the halftone image resulting from the trial change on the given voxel and the continuous tone image of the 3D object. The error value (or the error metric) may be calculated through use of a 3D HVS filter in manners as discussed. The processor 202 may also execute the instructions 224 to determine a difference in the error value from a present error value, such as an error value of zero. The processor 202 may store in the data store 204, the different in the error value, e.g., the delta error value, corresponding to the first trial change on the given voxel.

The processor 202 may implement a second trial change on the given voxel data and may calculate an error value (e.g., a mean-squared error value) corresponding to the second trial change. The processor 202 may also determine the delta error value corresponding to the second trial change and may store that delta error value in the data store 204. The processor 202 may continue this process to determine and store the delta error values corresponding to additional trial changes on the given voxel data. Once the trial changes have been completed for the given voxel data, the processor 202 may identify which state (e.g., characteristic data) of the voxel data corresponded to the most negative determined delta error value. In other words, the processor 202 may identify the voxel data that results in a minimization of the calculated error values (e.g., the minimized mean-square error). The processor 202 may update the voxel data for the given voxel with the identified voxel data. If none of the delta error values are negative, i.e., no trial change decreased the mean-squared error, the voxel data will not be changed. The processor 202 may also move to a next voxel and may repeat the process discussed above to iteratively modify voxel data and identify updated voxel data for the next voxel. Moreover, the processor 202 may repeat this process for each of the voxels that are located on surfaces (or equivalently, boundaries) of the 3D object such that the voxel data for each of the voxels on the surfaces of the 3D object may be updated to minimize or substantially minimize a perceptual difference between the continuous tone image and the updated halftone image of the 3D object.

According to examples, the process identified above may be applied multiple times on the same voxels as changes to the voxel data on neighboring voxels may cause the voxel data for those voxels to change. That is, for instance, the trial changes, such as swap trials, may result in changes in a voxel under processing when voxel data for voxels neighboring the voxel under processing are changed. Thus, for instance, during an iteration, the voxels that may be affected by changes to the voxel data of a neighboring voxel may be flagged for further processing in a next iteration.

By way of particular example, the processor 202 may generate and maintain a list, e.g., a lookup table, of the blocks 302 that are on the surface of the 3D object, i.e., the blocks 302 that include at least one voxel 304 that is on the surface of the 3D object. The processor 202 may generate the list during a first iteration of the voxel data modification. In the list, the processor 202 may identify which of the voxels are to be processed during a next iteration due to, for instance, a change in the voxel data of a neighboring voxel, e.g., a voxel that is within some predetermined neighborhood, such as, within a 3×3×3 neighborhood, within a 5×5×5 neighborhood, etc. Thus, during a current iteration, the processor 202 may identify which of the voxels are to be processed again for possible updating of the voxel data during a next iteration.

Generally speaking, the processor 202 may execute the instructions 222 and 224 to minimize the mean-squared error between perceptually filtered continuous tone image and the updated halftone image. The processor 202 may accomplish this by processing each of the voxels as discussed above during each iteration until a determination has been made that no changes to the voxel data for any of the voxels were made during an iteration. In addition or in other examples, the processor 202 may process each of the voxels as discussed above for a predetermined number of iterations even when changes to voxel data occurred in the last iteration. The predetermined number of iterations may be user-defined and may also be determined through testing.

The processor 202 may fetch, decode, and execute the instructions 226 to update the voxel data for the voxels on the surfaces of the 3D object using the identified voxel data discussed above. That is, the processor 202 may execute the instructions 226 to update the voxel data such that the voxel data corresponds with characteristics data that results in a minimized or nearly minimized perceptual error from the continuous tone image. The processor 202 may also fetch, decode, and execute the instructions 228 to generate halftone image printing data for the 3D object containing the updated voxel data. That is, for instance, the processor 202 may execute the instructions 228 to generate printing data that a 3D printer may implement in printing the 3D object.

The processor 202 may fetch, decode, and execute the instructions 230 to output the generated halftone image printing data for the 3D object. According to examples in which the apparatus 200 is a 3D printer, the processor 202 may output the halftone image printing data to 3D printing components 240 to cause or control the 3D printing components 240 to print the 3D object using the halftone image printing data. By way of particular example, the 3D printing components 240 may be print the 3D object using powder-based fusion techniques. That is, for instance, the 3D printing components 240 may include, among other components, a recoater for spreading build material particles, a printhead for delivering an agent onto the build material particles, and a fusing device for applying energy onto the spread build material particles to selectively fuse the build material particles to form parts of the 3D object. In other examples, the processor 202 may output the generated halftone image printing data to a 3D printer, to a data storage location, etc.

According to examples, the processor 202 may more efficiently evaluate the trial changes of the voxel data. In these examples, an additional correlation function $c_{\tilde{p}\tilde{e}}$ may be defined as:

$$c_{\tilde{p}\tilde{e}}(x) = \int \tilde{p}(y)\tilde{e}(y+x)dy \qquad \text{Equation (16)}$$

By substituting Equation (14) into Equation (15), E may be expressed as:

$$\begin{aligned} E &= \int |\tilde{e}(x)|^2 dx \qquad \text{Equation (17)} \\ &= \sum_m \sum_n e[m]e[n]\tilde{p}(x-Xm)\tilde{p}(x-Xn) \\ &= \sum_m \sum_n e[m]e[n]c_{\tilde{p}\tilde{p}}[m-n]. \end{aligned}$$

In addition, substituting Equation (14) into Equation (16) results in:

$$c_{\overline{pc}}[m] = c_{\overline{pc}}(Xm) = \sum_n e[n] c_{\overline{pp}}[n-m].  \quad \text{Equation (18)}$$

A look-up table that lists on-surface voxel addresses may be built and may include the correlation function $C_{\widetilde{pe}}$ matrices for voxel address on the surfaces of the 3D object in order to reduce the amount of computations performed. The total perceived error may be expressed as:

$$E = \sum_m e[m] c_{\overline{pe}}[m]. \quad \text{Equation (19)}$$

According to examples, instead of processing the voxels in raster order, the processor 202 may process the voxels in block order. Thus, for instance, in an iteration, the processor 202 may determine for each of the voxels 304 in a block 302 updated voxel data before processing the voxels 304 in a next block 302. In these examples, for a processed block 302, the processor 202 may determine whether a minimum delta error resulting from the updated voxel data for the voxels in the block 302 is less than zero and to accept the updated voxel data for the voxels in the block 302 if the minimum delta error for the block is less than zero. In addition, the processor 202 may accept a single change, e.g., a single updated voxel, in the block 302 during each iteration to reduce complexity. Furthermore, the processor 202 may update the correlation function $C_{\widetilde{pe}}$ value and may validate the blocks that surround the block 302, e.g., the blocks that are in a predefined neighborhood of the block 302. By way of example, in a predefined 7×7×7 neighborhood, the processor 202 may validate the 343 blocks around the block 302. That is, the processor 202 may identify those neighboring blocks as being valid, i.e., that those blocks are to be processed in the next iteration. However, if the minimum delta error is not less than zero, then the voxel data for the voxels in the block 302 may be marked as in-valid or finished, i.e., that those blocks are not to be processed in the next iteration unless some change occurs in nearby blocks that affect this block in the next iteration. In addition, the voxel data for the voxels in the block 302 may not be updated and a next block may be processed. Again, as discussed above, this process may be repeated until no changes are made during an iteration or if a predetermined number of iterations have been performed.

Figure 4:
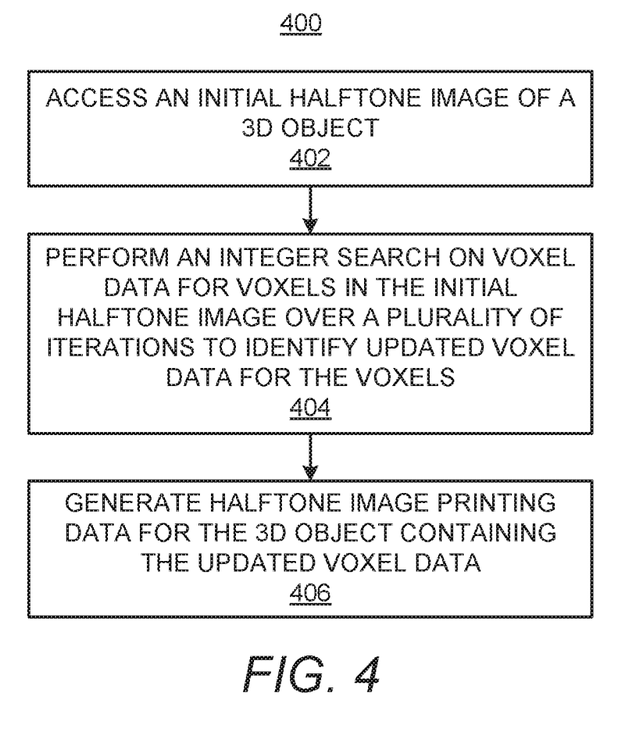
FIGS. 4 and 5, respectively, show flow diagrams of example methods for generating halftone image printing data for a 3D object.
Figure 5:
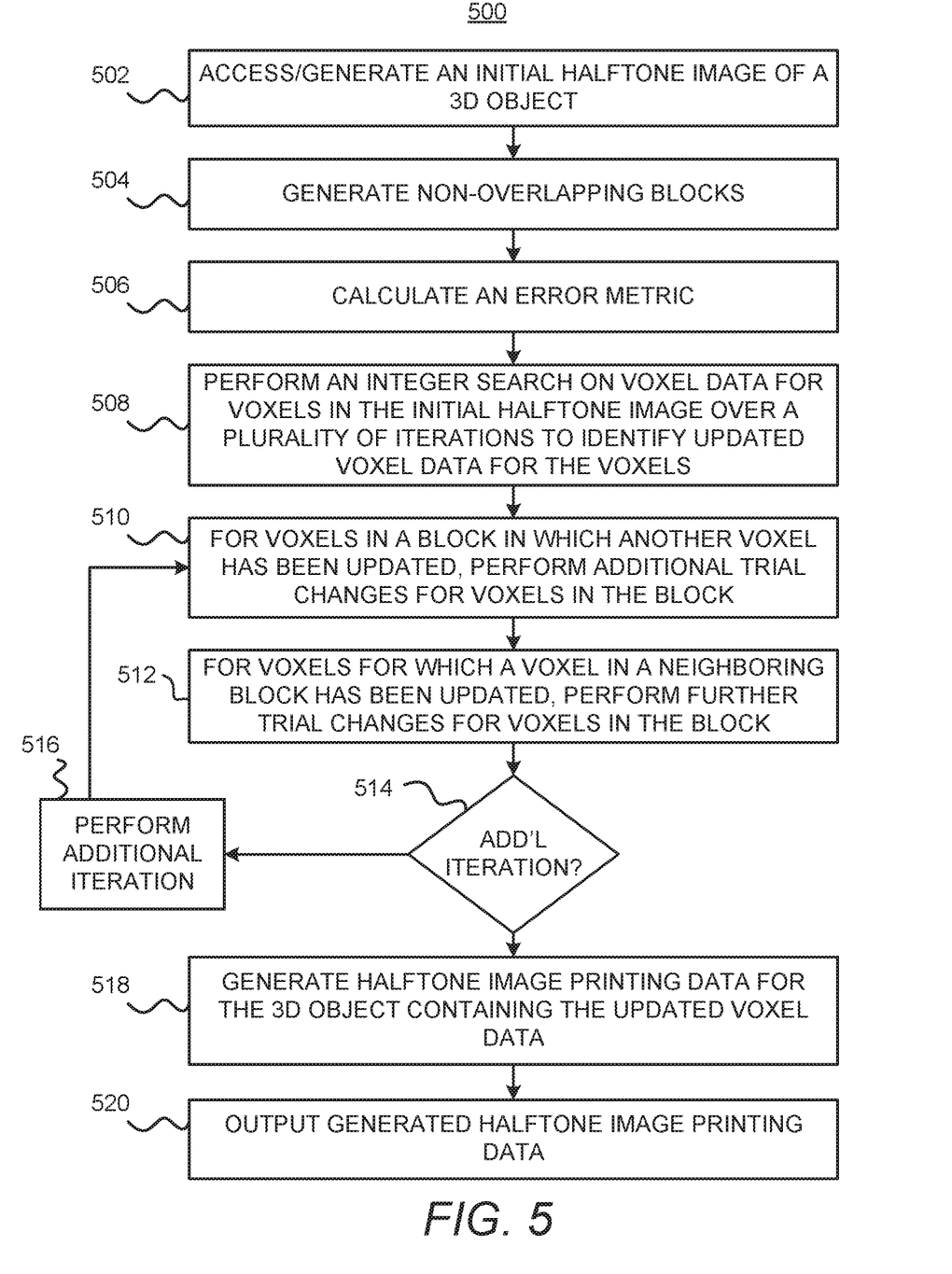

Various manners in which the apparatus 200 may be implemented are discussed in greater detail with respect to the methods 400 and 500 depicted in FIGS. 4 and 5. Particularly, FIGS. 4 and 5, respectively depict flow diagrams of example methods 400, 500 for generating halftone image printing data for a 3D object. It should be understood that the methods 400, 500 respectively depicted in FIGS. 4 and 5 may include additional operations and that some of the operations described therein may be removed and/or modified without departing from the scopes of the methods 400, 500. The descriptions of the methods 400, 500 are made with reference to the features depicted in FIGS. 1-3 for purposes of illustration.

With reference first to FIG. 4, at block 402, the processor 202 may execute the instructions 112, 216 to access an initial halftone image of a 3D object represented by voxels. As discussed above, the processor 202 may access the initial halftone image by receiving the initial halftone image from another source or may access the initial halftone image by generating the initial halftone image.

At block 404, the processor 202 may execute the instructions 114, 216, 218 to perform an integer search on voxel data of the voxels contained in the initial halftone image. For instance, the processor 202 may iteratively modify voxel data for the initial halftone image and may calculate error values as discussed above to identify updated voxel data for the voxels that results in a halftone image that has a smaller error from the continuous image than an error between the initial halftone image and the continuous image.

At block 406, the processor 202 may execute the instructions 116, 228 to generate halftone image printing data for the 3D object containing the updated voxel data. As discussed above, a 3D printer may implement the halftone image printing data to print the 3D object.

Turning now to FIG. 5, at block 502, the processor 202 may execute the instructions 112, 216 to access/generate an initial halftone image of a 3D object represented by voxels. Various manners in which the processor 202 may access/generate the initial halftone image are described above.

At block 504, the processor 202 may execute the instructions 218 to generate non-overlapping blocks of the initial halftone image. Particularly, the processor 202 may generate the non-overlapping blocks to each be composed of a 3D array of voxels, in which at least one of the voxels in each of the generated blocks is on the surface of the 3D object as discussed above with respect to FIGS. 2 and 3.

At block 506, the processor 202 may execute the instructions 220 to calculate an error metric from the continuous tone image and the initial halftone image. As discussed above, the error metric may be calculated based upon the perceived 3D halftone image and the perceived 3D continuous tone image through a human visual system through use of a 3D HVS filter. Generally speaking, the error metric may denote the difference between the initial halftone image and the continuous tone image of the 3D object.

At block 508, processor 202 may execute the instructions 114, 222, 224 to perform an integer search on voxel data for voxels in the initial halftone image over a plurality of iterations to identify updated voxel data for the voxels. For instance, the processor 202 may iteratively modify voxel data for the initial halftone image and may calculate error values as discussed above to identify updated voxel data for the voxels that results in a halftone image that has a smaller error value from the continuous image than an error value between the initial halftone image and the continuous image.

According to examples, to perform the integer search, the processor 202 may, for each of the voxels in the blocks that are on the surface of the 3D object, perform multiple trial changes on the voxel, calculate delta error values corresponding to the continuous tone image and modified halftone images resulting from the multiple trial changes, identifying a minimum delta error value from the calculated delta error values, and identify the state (e.g., the characteristic data) of the voxel that corresponds to be identified minimum filter error value.

At block 510, the processor 202 may execute the instructions 222, 224 to perform additional trial changes and determine whether the voxels in the blocks are to be updated based upon resulting calculated error values for each of the voxels in a block in which another voxel in the block has been updated. That is, for instance, in a next iteration, the processor 202 may further update the voxel data for a voxel in a block if another voxel in the block has been updated and a further update to the voxel results in a halftone image having a reduced error value.

At block 512, the processor 202 may execute the instructions 222, 224 to perform further trial changes and determine whether the voxels in the blocks are to be updated based upon resulting calculated error values for each of the blocks for which a voxel in a neighboring block has been updated. In other words, for instance, in a next iteration, the processor 202 may further update the voxel data for voxels in blocks if another voxel or voxels in a neighboring block has been updated and a further update to the voxels in the blocks results in a halftone image having a reduced error value.

At block 514, the processor 202 may determine whether an additional iteration is to be performed to further update the voxel data for any of the voxels, e.g., the voxels on the surfaces of the 3D object. According to examples, the processor 202 may determine that an additional iteration is to be performed if any changes to the voxel data of the voxels on the surfaces of the 3D object occurred and were accepted in the current iteration. In response to a determination that an additional iteration is to be performed, the processor 202 may perform an additional iteration at block 516. That is, the processor 202 may perform another integer search on the voxel data to identify updated voxel data for the voxels. The processor 202 may also repeat blocks 510-516 until a determination is made at block 514 that an additional iteration is not to be performed. For instance, the processor 202 may determine that an additional iteration is not to be performed at block 514 if the voxel data for any of the voxels on the surfaces of the 3D object were not changed or identified changes were not accepted during the current iteration. In addition or in other examples, the processor 202 may determine that an additional iteration is not to be performed at block 514 if a predetermined number of iterations have already been performed. The predetermined number of iterations may be user-defined and/or may be determined through testing.

At block 518, the processor 202 may execute the instructions 228 to generate halftone image printing data containing voxel data that has been updated through implementation of blocks 502-516. That is, for instance, the processor 202 may execute the instructions 228 to generate halftone image printing data that a 3D printer may implement in printing the 3D object.

At block 520, the processor 202 may execute the instructions 230 to output the generated halftone image printing data. According to examples, the processor 202 may output the halftone image printing data to 3D printing components 240 to cause or control the 3D printing components 240, e.g., powder-based fusing printing components, to print the 3D object using the halftone image printing data. In other examples, the processor 202 may output the generated halftone image printing data to a 3D printer, to a data storage location, etc.

Some or all of the operations set forth in the methods 400, 500 may be contained as utilities, programs, or subprograms, in any desired computer accessible medium. In addition, the methods 400, 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that are to cause the processor to:
      access an initial halftone image of a three-dimensional (3D) object, the initial halftone image being generated from a continuous tone image of the 3D object;
      iteratively modify voxel data for the initial halftone image to identify updated voxel data that more accurately corresponds to the continuous tone image than the initial halftone image; and
      generate halftone image printing data for the 3D object containing the updated voxel data.

2. The apparatus according to claim 1, wherein the instructions are further to cause the processor to:
   generate non-overlapping blocks of the initial halftone image of the 3D object, wherein each of the generated blocks is composed of a 3D array of voxels and at least one of the voxels in each of the generated blocks is on a surface of the 3D object, and
   wherein the updated voxel data comprises a respective characteristic data for the voxels on the surface of the 3D object, the characteristic data identifying at least one of a color, a transparency level, a material, and a texture.

3. The apparatus according to claim 2, wherein the instructions are further to cause the processor to:
   calculate an error metric from the continuous tone image and the initial halftone image; and
   wherein to identify the updated voxel data, the instructions are further to cause the processor to:
      iteratively modify the voxel data for the voxels in the generated blocks;
      calculate error values corresponding to the continuous tone image and iteratively modified halftone images resulting from the modified voxel data; and
      update the voxel data using modified voxel data that results in a minimization of the calculated error values.

4. The apparatus according to claim 2, wherein the instructions are further to cause the processor to:
   for each of the voxels in the generated blocks that is on the surface of the 3D object,
      perform multiple trial changes on the voxel;
      calculate delta error values corresponding to the continuous tone image and a modified halftone image resulting from the multiple trial changes;
      identify a minimum delta error value from the calculated delta error values;

identify a state of the voxel that corresponds to the identified minimum delta error value; and set the updated voxel data to the identified state.

5. The apparatus according to claim 4, wherein the instructions are further to cause the processor to:

for each of the voxels in a generated block in which another voxel in the generated block has been updated, perform additional multiple trial changes on the voxel;

calculate delta error values corresponding to the continuous tone image and modified halftone images resulting from the additional multiple trial changes;

identify another minimum delta error value from the calculated delta error values;

identify the state of the voxel that corresponds to the identified another minimum delta error value; and set the updated voxel data to the identified state.

6. The apparatus according to claim 5, wherein the instructions are further to cause the processor to, for each of the generated blocks for which a voxel in a neighboring generated block has been updated, perform further trial changes and determine whether the voxel data of the voxels in the generated blocks are to be updated.

7. The apparatus according to claim 6, wherein the instructions are further to cause the processor to determine whether to continue to iteratively modify the voxel data and to generate the halftone image printing data in response to a determination that iterative modification of the voxel data is to be ceased.

8. The apparatus according to claim 1, wherein the instructions are further to cause the processor to accept only one change within each generated block during each iteration of the voxel data modification.

9. A method comprising:

accessing an initial halftone image of a three-dimensional (3D) object represented by voxels;

performing an integer search on voxel data of the voxels contained in the initial halftone image to identify updated voxel data for the voxels that results in a halftone image that has a smaller error from the continuous image than an error between the initial halftone image and the continuous image; and generating halftone image printing data for the 3D object containing the updated voxel data.

10. The method according to claim 9, further comprising:

generating non-overlapping blocks of the initial halftone image, wherein each of the generated blocks is composed of a 3D array of voxels and at least one of the voxels in each of the generated blocks is on a surface of the 3D object, wherein the updated voxel data comprises a respective characteristic data for the voxels on the surface of the 3D object, the characteristic data identifying at least one of a color, a transparency level, a material, and a texture; and calculating an error metric from the continuous tone image and the initial halftone image, wherein performing the integer search comprises performing the integer search to identify updated voxel data that results in a lower error metric than the calculated error metric.

11. The method according to claim 10, wherein performing the integer search comprises:

for each of the voxels in the generated blocks that is on the surface of the 3D object, performing multiple trial changes on the voxel;

calculating delta error values corresponding to the continuous tone image and modified halftone images resulting from the multiple trial changes;

identifying a minimum delta error value from the calculated delta error values;

identifying the state of the voxel that corresponds to the identified minimum delta error value; and setting the updated voxel data to the identified state.

12. The method according to claim 11, further comprising:

for each of the voxels in a generated block in which another voxel in the generated block has been updated, performing additional trial changes and determining whether the voxels in the generated blocks are to be updated based upon resulting calculated error values; and for each of the generated blocks for which a voxel in a neighboring generated block has been updated, performing further trial changes and determining whether the voxels in the generated blocks are to be updated based upon resulting calculated error values.

13. A non-transitory computer readable medium on which is stored machine readable instructions that when executed by a processor, cause the processor to:

access an initial halftone image of a three-dimensional (3D) object, wherein the initial halftone image is generated from a continuous tone image of the 3D object;

generate non-overlapping blocks of the initial halftone image, wherein each of the generated blocks is composed of a 3D array of voxels and at least one of the voxels in each of the generated blocks is on a surface of the 3D object;

calculate an error metric from the continuous tone image and the initial halftone image, perform an integer search on voxel data of the voxels contained in the generated blocks over a plurality of iterations to identify updated voxel data for the voxels that results in a lower error metric than the calculated error metric; and generate halftone image printing data for the 3D object containing the updated voxel data.

14. The non-transitory computer readable medium according to claim 13, wherein the instructions are further to cause the processor to:

for each of the voxels in the generated blocks that is on the surface of the 3D object, perform multiple trial changes on the voxel;

calculate delta error values corresponding to the continuous tone image and modified halftone images resulting from the multiple trial changes;

identify a minimum delta error value from the calculated delta error values;

identify the state of the voxel that corresponds to the identified minimum delta error value; and set the updated voxel data to the identified state.

15. The non-transitory computer readable medium according to claim 13, wherein the instructions are further to cause the processor to:

for each of the voxels in a generated block in which another voxel in the generated block has been updated, perform additional trial changes and determine whether the voxels in the generated blocks are to be updated based upon resulting calculated error values; and for each of the generated blocks for which a voxel in a neighboring generated block has been updated, perform further trial changes and determine whether the voxels in the generated blocks are to be updated based upon resulting calculated error values.

* * * * *